United States Patent
Botts et al.

(10) Patent No.: US 9,386,220 B2
(45) Date of Patent: Jul. 5, 2016

(54) ELECTRO-OPTICAL (EO)/INFRARED (IR) STARING FOCAL PLANES WITH HIGH RATE REGION OF INTEREST PROCESSING AND EVENT DRIVEN FORENSIC LOOK-BACK CAPABILITY

(71) Applicant: Raytheon Company, Waltham, MA (US)

(72) Inventors: Steven E. Botts, Santa Barbara, CA (US); Micky R. Harris, Lompoc, CA (US); John L. Vampola, Santa Barbara, CA (US); Michael McLaughlin, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 183 days.

(21) Appl. No.: 14/099,119

(22) Filed: Dec. 6, 2013

(65) Prior Publication Data

US 2015/0163401 A1    Jun. 11, 2015

(51) Int. Cl.
*G01J 5/02* (2006.01)
*H04N 5/232* (2006.01)
(Continued)

(52) U.S. Cl.
CPC .............. *H04N 5/23229* (2013.01); *G06K 9/46* (2013.01); *H04N 5/332* (2013.01); *H04N 5/341* (2013.01); *H04N 5/369* (2013.01); *H04N 5/37452* (2013.01); *G06K 2009/4666* (2013.01)

(58) Field of Classification Search
CPC ................................. H04N 5/232; G06K 9/46
USPC ....................... 250/349; 348/231.99
See application file for complete search history.

(56) References Cited

U.S. PATENT DOCUMENTS 5,107,122 A * 4/1992 Barkan ................. G01T 1/2928
                                                    250/370.01
9,069,061 B1 * 6/2015 Harwit .................. G01S 7/4863

FOREIGN PATENT DOCUMENTS

EP    2 299 696 A1    3/2011
EP    2 582 131 A2    4/2013
(Continued)

OTHER PUBLICATIONS

Notification of Transmittal of the International Search Report and the Written Opinion of the International Searching Authority, or the Declaration, PCT/US2014/067278, Mar. 5, 2015, 1 page.

(Continued)

*Primary Examiner* — David Porta
*Assistant Examiner* — Meenakshi Sahu
(74) *Attorney, Agent, or Firm* — Daly, Crowley, Mofford & Durkee, LLP (57) ABSTRACT

A focal plane array having: a plurality of detectors; a plurality of unit cell sections, each section being fed by charge produced by corresponding detector for producing a sequence of frames; and a plurality of sets of storage sections, each section being coupled to a corresponding one of the unit cells. Each set of storage sections includes a plurality of storage units for sequentially storing the frames. A region of interest selector section examines the frames of the plurality of unit cells, to detect at least one of the frames having a predetermined characteristic. A processor: (i) identifies a sub-set of the plurality of unit cells proximate the detected unit cells having the predetermined characteristic to establish a region of interest; and (ii) sequentially reads the plurality of storage units in the storage sections coupled to the sub-set of unit cells in the established region of interest.

12 Claims, 9 Drawing Sheets

(51) Int. Cl.
*G06K 9/46* (2006.01)
*H04N 5/369* (2011.01)
*H04N 5/33* (2006.01)
*H04N 5/341* (2011.01)
*H04N 5/3745* (2011.01)

(56) References Cited

FOREIGN PATENT DOCUMENTS

| EP | 2 582 131 A3 | 10/2013 |
| EP | 2 760 199 A1 | 7/2014 |
| WO | WO 2012/058239 A1 | 10/2011 |
| WO | WO 2012/138345 A1 | 10/2012 |

OTHER PUBLICATIONS

International Search Report, PCT/US2014/067278, Mar. 5, 2015, 3 pages.
Written Opinion of the International Searching Authority, PCT/US2014/067278, Mar. 5, 2015, 7 pages.

* cited by examiner

ELECTRO-OPTICAL (EO)/INFRARED (IR) STARING FOCAL PLANES WITH HIGH RATE REGION OF INTEREST PROCESSING AND EVENT DRIVEN FORENSIC LOOK-BACK CAPABILITY

TECHNICAL FIELD

This disclosure relates generally to Electro-Optical (EO)/Infrared (IR) staring focal planes with high rate region of interest processing and more particularly to EO/IR staring focal planes with high rate region of interest processing and event driven forensic look-back capability.

BACKGROUND

As is known in the art, Electro-Optic (EO)/Infrared IR imaging, detection, and characterization systems are being required to provide high Field Of View (FOV) focal plane array (FPA) sensors with ever increasing optical resolution along with higher sampling frequency to provide geometric and temporally accurate characterization of events within the FOV of the sensor. Additionally, these systems require low noise and high dynamic range to improve radiometric characterization resulting in greater data conversion requirements. The electrical bandwidth associated with focal plane arrays in ever increasing high etendue systems is so large that there is insufficient bandwidth in the sensor, platform, and transmission of data back to the system receiver to effectively use the capability of the advanced sensor systems. Previous sensors have attempted to provide large area coverage by selecting the field-of-view (FOV) to the match field-of-regard (FOR) and compromising the object plane resolution. Others have compromised the temporal resolution capability to enable reasonable data rates. Some systems compromise persistence to achieve FOV/FOR desires. Large staring IR focal plane arrays that match sub-system specifications for pixel count, resolution, data rate and dynamic range have been produced; however, these arrays have been the result of a compromised flow down of requirements from sensor manufacturers because of limitations in the bandwidth of other subsystems of the system.

To date, deployed systems have not had end-to-end response times fast enough, in some applications, to observe and respond, owing to limitations in vehicle, processing, transmission, and operator response times. Consequently, systems deployed to date have generally been limited in their ability to persistently characterize the desired Field of Regard (FOR). They have had to compromise the desired capability to achieve a workable system. For example, systems have deployed step stare sensors that lose persistence to cover the FOR, systems with too few detectors have inadequate object space resolution, or have drastically reduced the temporal frequency and suffered reduce capability for time-based characterization of events. Further, systems have not been able to achieve the desired dynamic range and have had to sacrifice radiometric accuracy.

Thus, today's Read Out Integrated Circuits (ROICs) and sensor systems have not simultaneously supported the data rate, resolution, numbers of pixels, and numbers of bits to meet the very large etendue desired by future systems. This results in compromise of system performance.

SUMMARY

In accordance with the disclosure a focal plane array is provided having: a plurality of detectors; a plurality of unit cell sections, each section being fed by charge produced by corresponding detector for producing a sequence of frames; and a plurality of sets of storage sections, each section being coupled to a corresponding one of the unit cells. Each set of storage sections includes a plurality of storage units for sequentially storing the frames. A region of interest selector section examines the frames of the plurality of unit cells, to detect at least one of the frames having a predetermined characteristic. A processor: (i) identifies a sub-set of the plurality of unit cells proximate the detected unit cells having the predetermined characteristic to establish a region of interest; and (ii) sequentially reads the plurality of storage units in the storage sections coupled to the sub-set of unit cells in the established region of interest.

With such an arrangements a structure is provided that greatly increases effective etendue. The structure reads out an event and "looks back" at previous frames of data around and prior to the event. The structure can be applied to bandwidth resources of sensor system on areas of motion or change within the FOV of the sensor. It allows observation of the areas of motion or change within the FOV of the sensor before they changed or moved in order to obtain an accurate characterization of the event and can begin working in a windowed mode to better manage sensor bandwidth.

In one embodiment, a focal plane array is provided having: a plurality of detectors; and a plurality of unit cell sections, each one of the sections being fed by charge produced by corresponding one of the detectors. Each one of the cells includes; (i) an integrator for integrating the charge fed thereto at a first integration/reset at a rate, R1; (ii) a summer, for summing a plurality, M of the produced frames to produce frames at a low frame rate R2, where R2 is R1/M; and (iii) a toggle for periodically switching the integrated charge between: the summer; and, a high data rate output to produce frames at the high frame rate during a subsequent second period of time. A low data rate section is fed by the frames produced at the low frame rate by the plurality of unit cells, for processing the low frame rate frames produced of the plurality of unit cells. A high data rate section is coupled to the frames produced at the high frame rate by the plurality of unit cells. The high data rate section includes: a plurality of sets of storage sections, each one of the sections being coupled to a corresponding one of the unit cells, each one of the set of storage sections comprising: a plurality of storage units for sequentially storing the frames produced at the high frame rate. A region of interest selector section: examines the frames produced at the to frame rate from the plurality of unit cells, to detect at least one of the frames produced at the low frame rate having a predetermined characteristic; identifies a sub-set of the plurality of unit cells proximate to at least one of the unit cells detected as having the predetermined characteristic to establish a region of interest; and, sequentially reads the plurality of storage units in the storage sections coupled to the selected unit cells at the high frame rate.

By simultaneously acquiring data at a high bandwidth and transmitting data at a low bandwidth, it is possible to sustain persistence over the entire Field of Regard. Only when an event occurs is the system reconfigured to track and characterize the event, still sustaining operations within the bandwidth constraints of the system.

With such an arrangement, analog and digital circuits function to constantly read pixel data from every pixel in entire FOV acquired at a desired high sample rate, constantly store discrete time sampled data, constantly perform temporal filtering on low rate data to detect events, and constantly perform integration of samples and reads these out to the external system at an achievable lower system data rate. Upon detection of a significant event, this ROIC/processor (ROICP) continues reading the normal low rate data from the entire FOV and inserts into the digital data stream a ROI data stream that monitors (at a high temporal rate) a small region around location of the event (a Region Of Interest (ROI)) and begins by reading out the a predetermined plurality of frames prior to the event at the higher data rate, and continues to readout the data in real time at the higher data rate.

Thus, the system has the ability to specify multiple ROIs on a frame by frame basis to allow high rate readout of a number of relatively small ROI windows.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
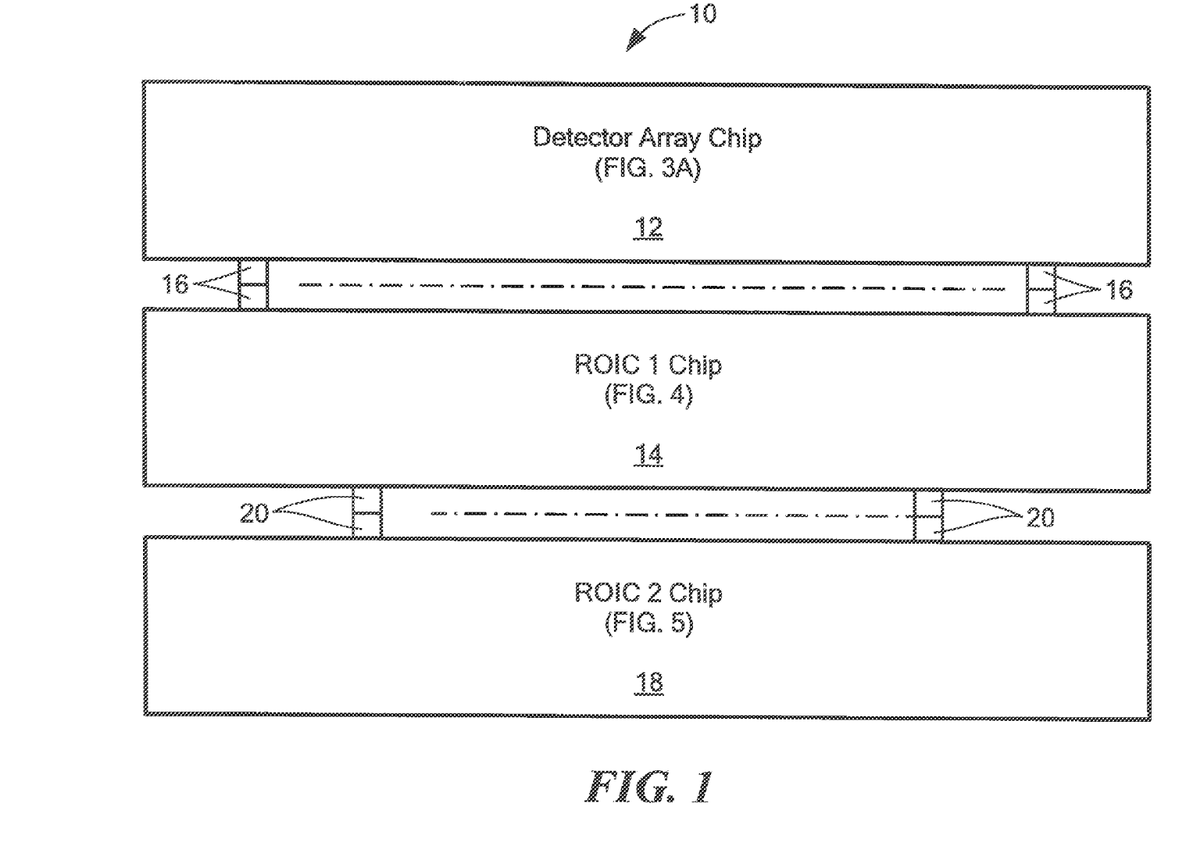
FIG. 1 is a side view of a focal plane array according to the disclosure.
Figure 2A:
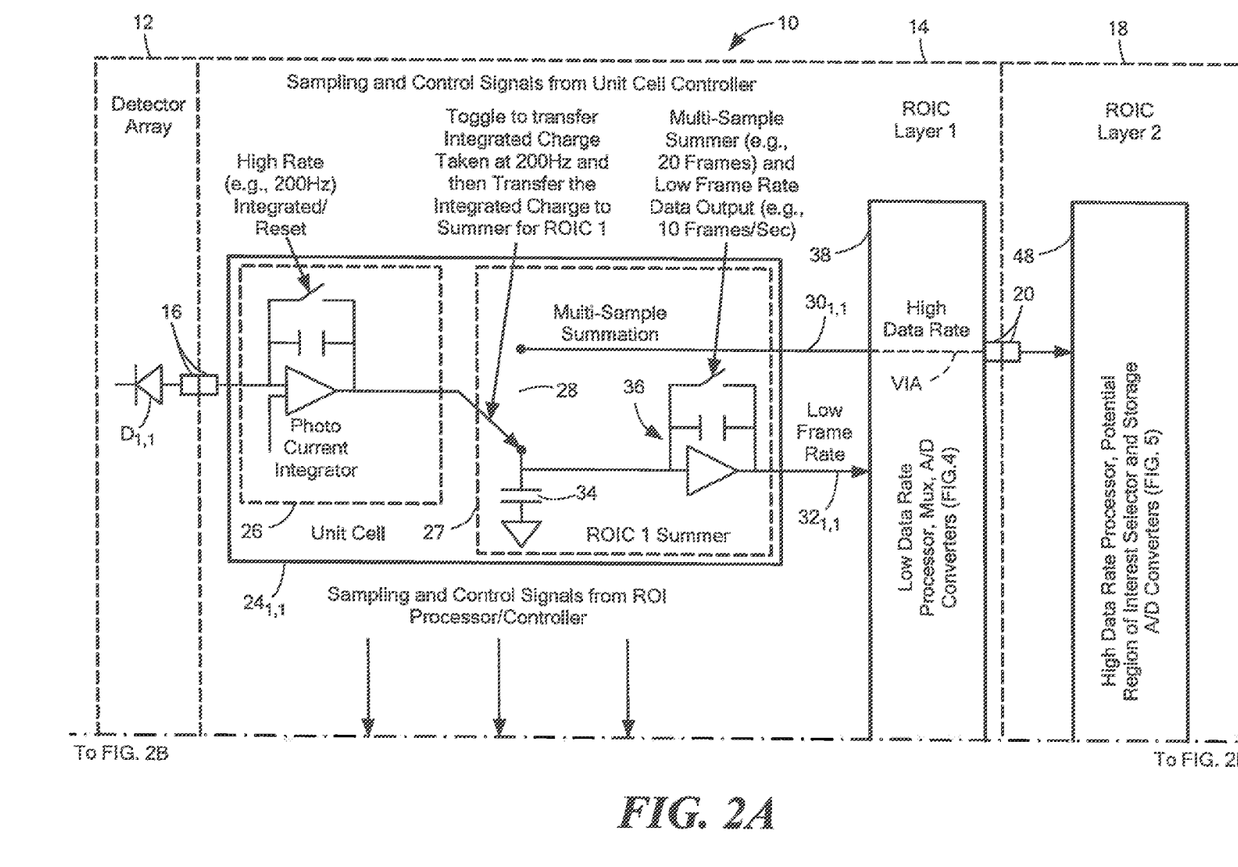
FIG. 2A and FIG. 2B, collectively referred to as FIG. 2, is a block diagram of the focal plane array of FIG. 1.
Figure 2B:
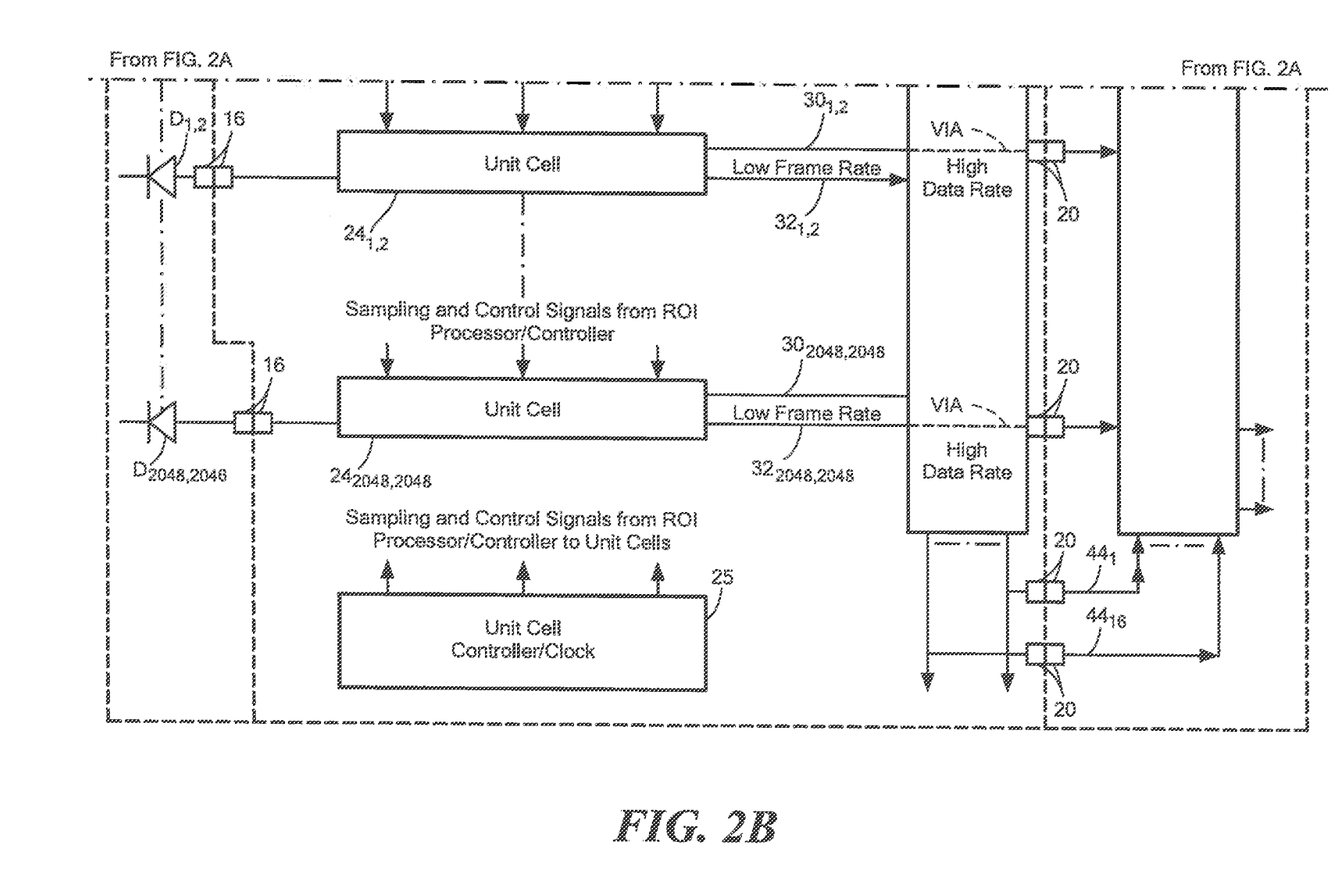

Referring now to FIGS. 1 and 2, a focal plane array 10, here for example, a staring array, is shown having a detector array semiconductor (here for example, HgCdTe) chip 12 bonded and electrically connected to a first semiconductor (here for example, silicon) ROIC 1 chip 14 through electrical contacts 16, and a second semiconductor (here for example, silicon) ROIC 2 chip 18 bonded and electrically connected to the ROIC 1 chip 14 through electrical contacts 20, in a stacked arrangement, as shown in FIG. 1, here using Through Silicon Vias and Direct Bond Hybridization.

Figure 3A:
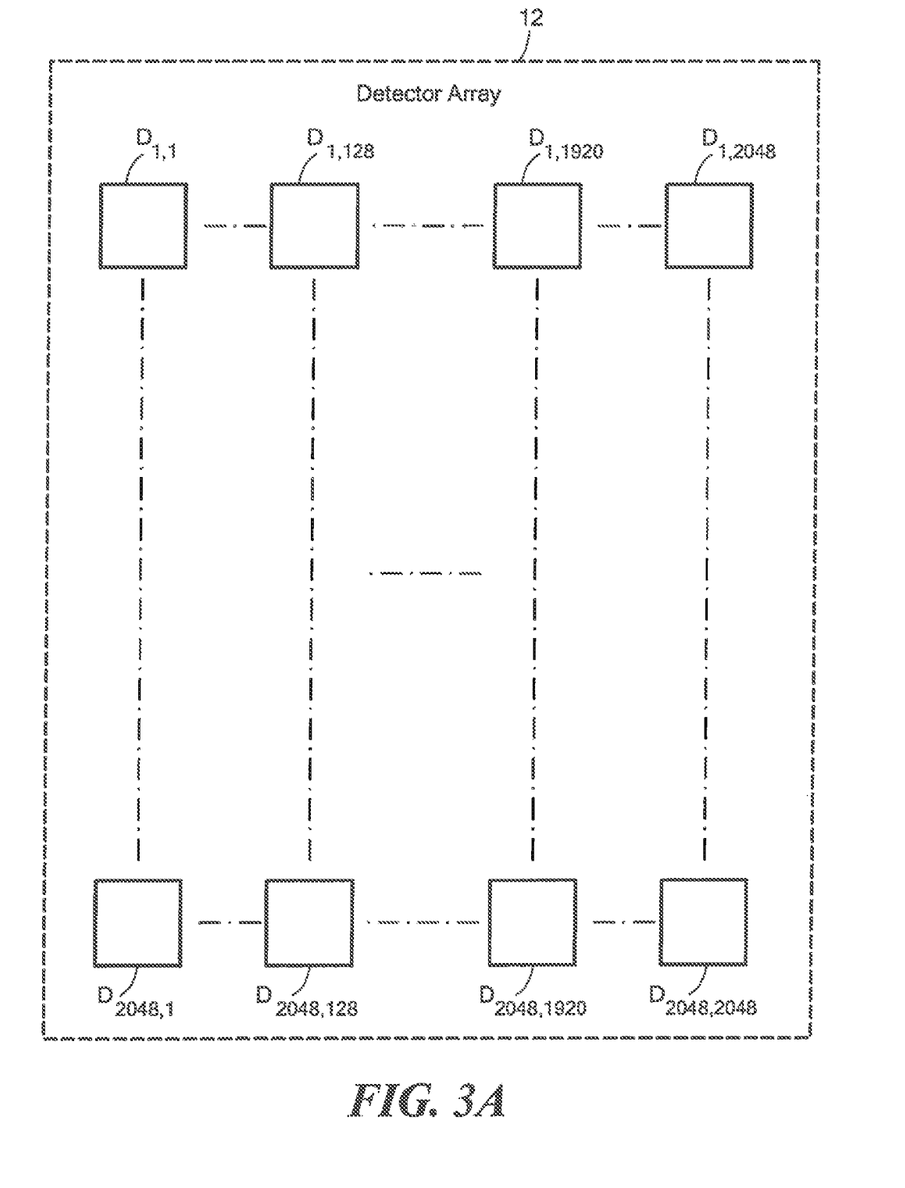
FIG. 3A is a plan view of a chip having a plurality of detectors used in the focal plane array of FIGS. 1 and 2.

The detector array chip 12 includes a plurality of detectors, here, for example, a square 2048×2048 array of EO and/or IR diode detectors $D_{1,1}$ through $D_{2048,2048}$, arranged in 2048 row and 2046 columns, as shown in FIG. 3A.

Figure 3B:
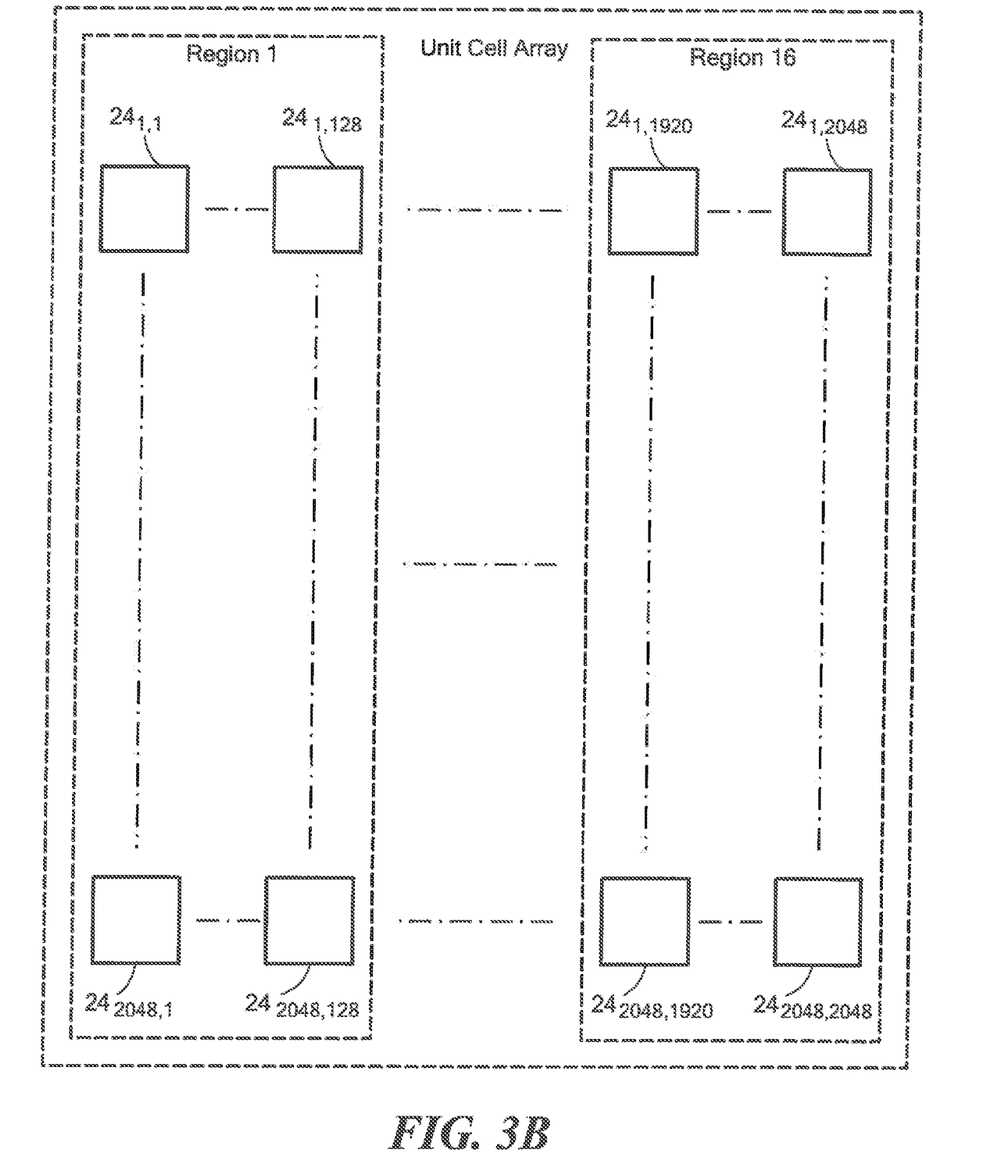
FIG. 3B is a plan view of a unit cells used in the focal plane array of FIGS. 1 and 2.

Referring again to FIG. 2, the ROIC 1 chip 14 includes a plurality of unit cells $24_{1,1}$ through $24_{2048,2048}$, each one of the cells $24_{1,1}$ through $24_{2048,2048}$, being coupled to a corresponding one of the detectors $D_{1,1}$ through $D_{2048,2048}$, as shown. The plurality of unit cells $24_{1,1}$ through $24_{2048,2048}$, here a square 2048×2048 array of plurality of unit cells $24_{1,1}$ through $24_{2048,2048}$, arranged in row and columns, as shown in FIG. 3B. More particularly, the plurality of unit cells $24_{1,1}$ through $24_{2048,2048}$, have been partitioned for processing considerations, into regions, here for example, sixteen columnar regions REGION 1-REGION 16 as shown in FIG. 3B.

Referring again to FIG. 2, each one of the cells $24_{1,1}$ through $24_{2048,2048}$ is identical in construction, and receives timing signals from a unit cell controller/clock 25 to operate in parallel; an exemplary one thereof, here cell $24_{1,1}$, being shown to include a resettable integrator 26 fed by detector $D_{1,1}$, such integrator 26 being reset at a predetermined rate, R1, here for example 200 Hz. The output of the integrator 26 is fed to a multi-sample summation section and switch section 27 for summing a plurality, M of the produced frames to produce frames at a low frame rate R2, where R2 is R1/M. Here, for example, M=20 and R2 is 10 Hz.

More particularly, the multi-sample summation section and switch section 27 includes a toggle switch 28 having an input coupled to the output of the resettable integrator 26 and a pair of outputs: one output being a high frame rate output $30_1$ of the multi-sample summation section and switch section 27 and a second output being coupled to a low frame rate output $32_1$ to a capacitor 34 and serially connected resettable summer 36, as indicated. The resettable summer 36 is reset at the rate $R_2$, for, as noted above, summing a plurality of M of the produced frames to produce frames at a low frame rate $R_2$, where $R_2$ is $R_1$/M on output $32_1$. Here, for example, M=20 and $R_2$ is 10 Hz. The low data rate outputs $32_1$ through $32_{2048 \times 2048}$, are fed in parallel to a low data rate processor, MUX and A/D converter section 38, to be described in detail in connection with FIG. 4, and the high date rate output is fed through the ROIC 1 chip 14 to the ROIC 2 chip 18, such chip 18 having a high data rate processor, potential region of interest storage section, and A/D converter section 48, to be described in detail in connection with FIG. 5.

The to data rate processor, MUX and A/D converter section 38 (FIG. 4) includes a plurality of here sixteen region multiplexers $40_1$-$40_{16}$, each one having 2048×128 inputs, each one being fed by the unit cells in the corresponding one of the sixteen regions $24_1$-$24_{16}$ (FIG. 3B). Thus, for example, considering exemplary unit cells $24_{1,1}$-$24_{2048,128}$ in region 1 (FIG. 3B) and unit cells $24_{1,1920}$-$24_{2048,2048}$ in region 16, and understanding that the other unit cells are connected in like manner, the outputs $32_{1,1}$-$32_{2048,128}$ of unit cells $24_{1,1}$-$24_{2048,128}$ are coupled to region multiplexer $40_1$, the outputs $32_{1,1920}$-$32_{2048,2048}$ of unit cells $24_{1,1920}$-$24_{2048,2048}$ are coupled to region multiplexer $40_{16}$. The region multiplexers $40_1$-$40_{16}$ operate in parallel, and each one produces at its output the charge on the output from the unit cells fed thereto sequentially at a multiplexer rate of 2.62 MHz=128×2048×10 Hz. Thus, considering exemplary multiplexer $40_1$, the outputs $30_{1,1}$-$30_{2048,128}$ of unit cells $24_{1,1}$-$24_{2048,128}$ appear sequentially at output of multiplexer $40_1$ at the 2.62 Mhz rate. As noted above, the entire sixteen multiplexers $40_1$-$40_{16}$ operate in this manner in parallel; thus each one of the output produces a sequence of 128×2048 analog signals.

Figure 4:
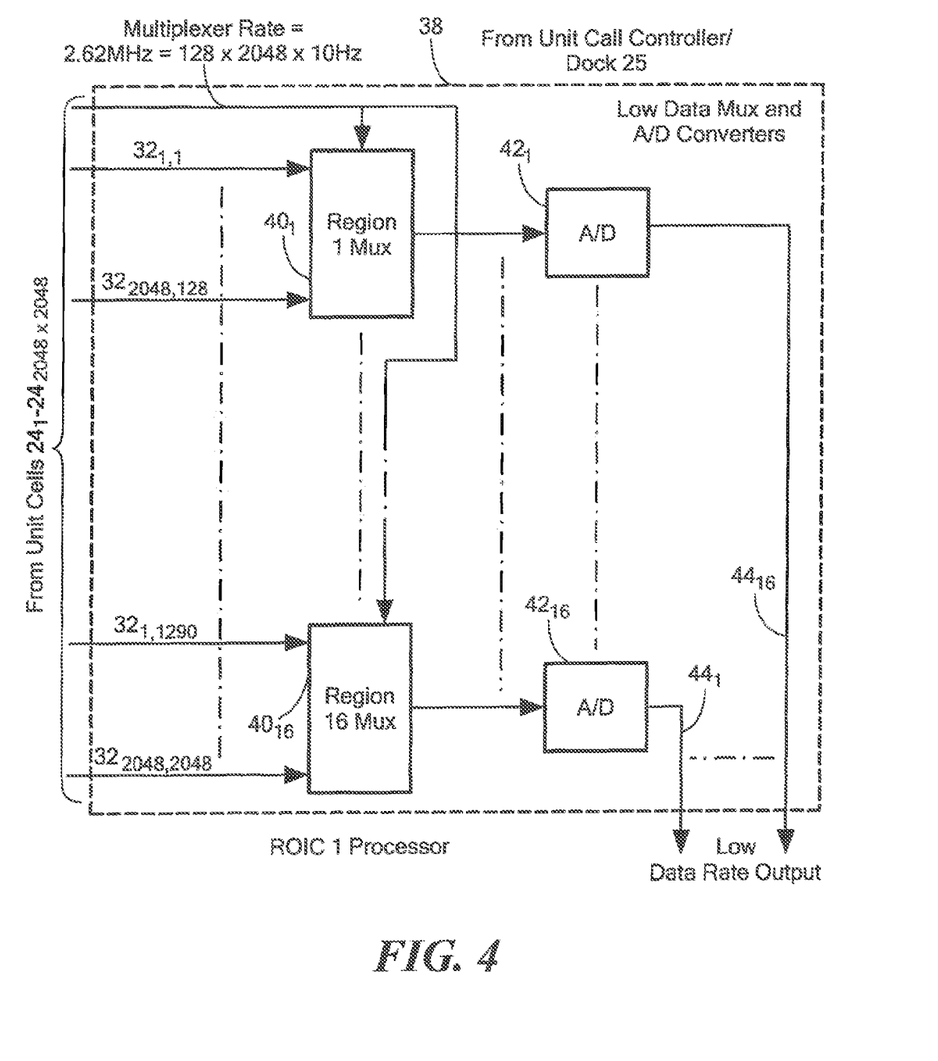
FIG. 4 is a block diagram of a Low Data Rate Processor, Multiplexer, A/D Converter Section used in the Read Out Integrated Circuit (ROIC 1) chip used in the focal plane array of FIGS. 1 and 2.

The output of the each one of the sixteen region multiplexers $40_1$-$40_{16}$ is coupled to a corresponding one of sixteen analog to digital converters $42_1$-$42_{16}$, as shown to produce sixteen streams 128×2048 digital words in parallel; each one of the 128×2048 digital words being coupled to a corresponding one of the outputs $44_1$-$44_{16}$ at a rate of $R_2 \times 128 \times 2048$.

Figure 5A:
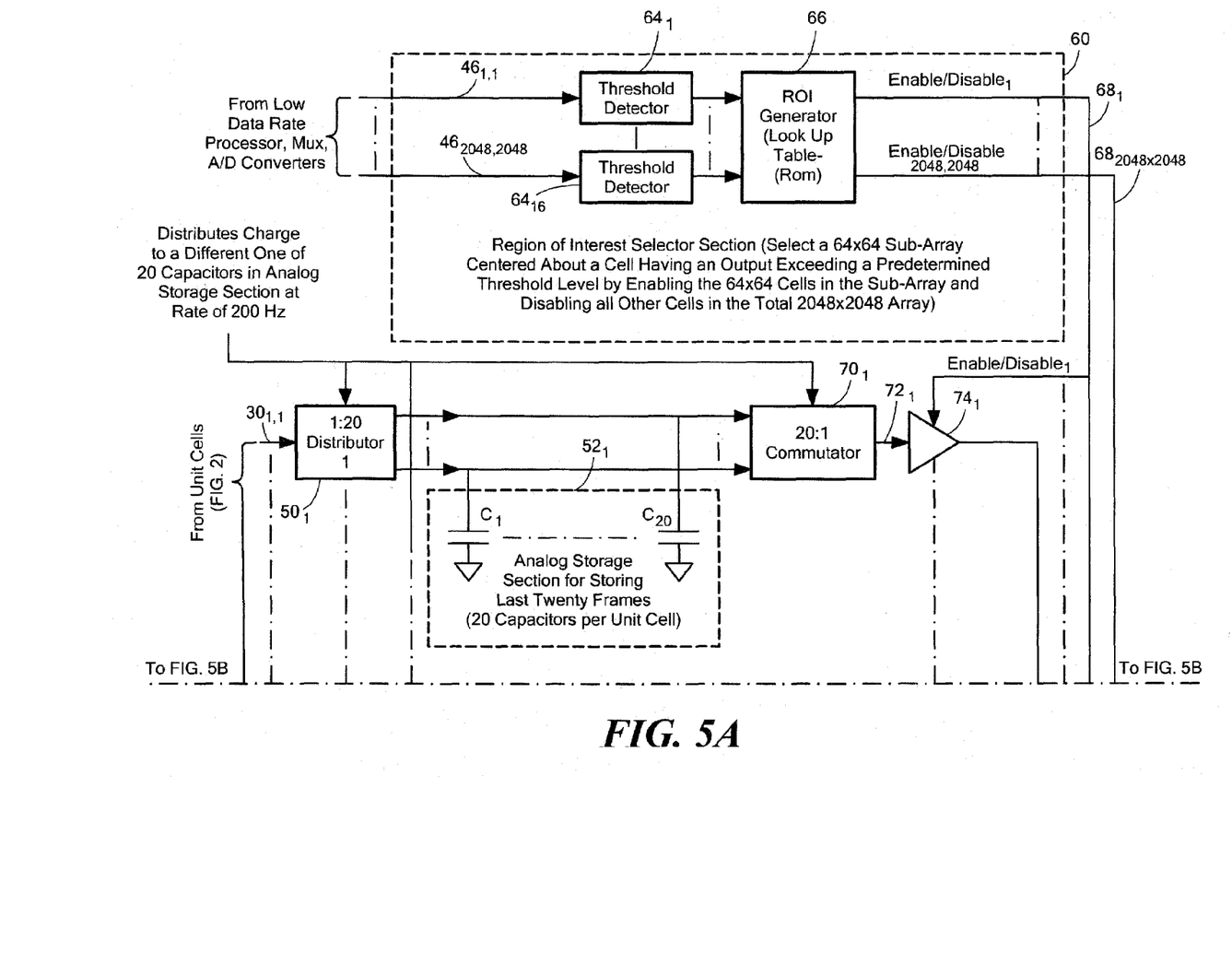
FIG. 5A and FIG. 5B, collectively referred to as FIG. 5, is a block diagram of a High Data Rate Processor, Potential Region of Interest Selector and Storage, A/D Converters Section used in a second Read Out Integrated Circuit (ROIC 2) chip used in the focal plane array of FIGS. 1 and 2.
Figure 5B:
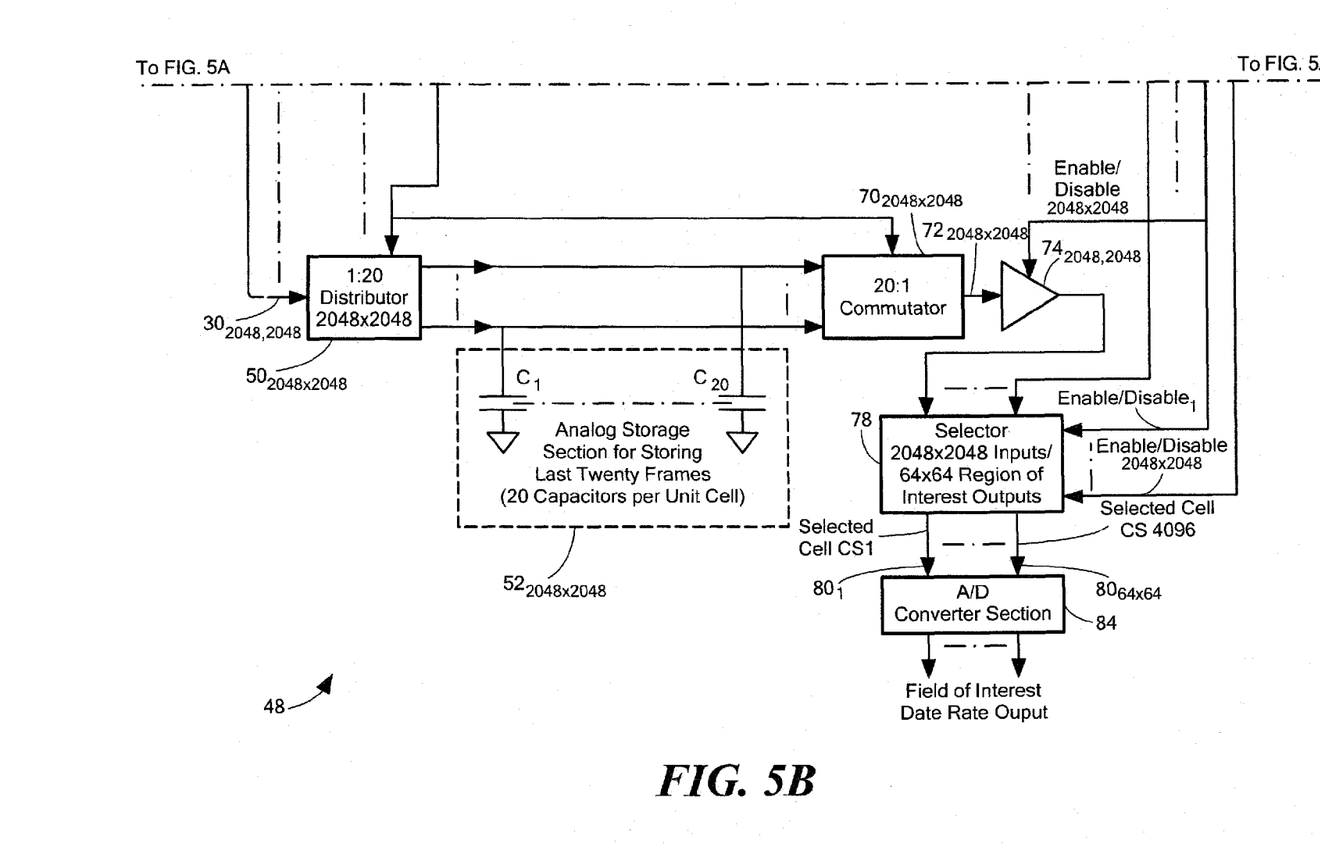

Referring now to FIG. 5, the ROIC 2 chip 18 includes the high data rate processor, potential region of interest selector section, and A/D converter section 84. More particularly, the high data rate processor, potential region of interest selector section, and A/D converter section 84 includes a plurality of here 2046×2048 distributors $50_1$-$50_{2048 \times 2048}$, each one of the 2048×2048 distributors $50_1$-$50_{2048 \times 2048}$ being fed charge from a corresponding one the high date rate outputs $30_{1,1}$-

$30_{2048,2048}$ of unit cells $24_{1,1}$-$24_{2048,2048}$ (FIG. 2), respectively. The high data rate processor, potential region of interest selector section, and A/D converter section 84 includes a plurality of analog storage section $52_1$-$52_{2028\times2048}$, each one being coupled to a corresponding one of the 2048×2048 distributors $50_1$-$50_{2048\times2048}$, as shown in FIG. 5. Here, each one of the analog storage sections $52_1$-$52_{2028\times2048}$ includes a plurality of, here for example, twenty capacitors $C_1$-$C_{20}$, as indicated for exemplary storage sections $52_1$ and $52_{2048\times2048}$. Each one of the distributors $50_1$-$50_{2048\times2048}$ distributes the charge at the input thereof sequentially to a corresponding one of the twenty capacitors $C_1$-$C_{20}$, in the one of analog storage sections $52_{1,1}$-$52_{2028\times2048}$ coupled to it at a rate of 200 Hz. Thus, considering exemplary distributor $50_1$, the high data rate frames on output $30_{1,1}$ from unit cell $24_{1,1}$ (FIG. 2) during a first frame period of 5 milliseconds are distributed first to capacitor $C_1$, then to capacitor $C_2$, and so forth to capacitor $C_{20}$; after which the distribution process repeats. Thus, the capacitors $C_1$-$C_{20}$ in the analog storage section $52_1$-$52_{2028\times2048}$ store the past twenty frames over the entire array of detectors $D_{1,1}$-$D_{2048\times2048}$ (FIG. 3A).

The high data rate processor, potential region of interest storage section, and A/D converter section 84 also includes a region of interest selector section 60 fed by the sixteen outputs $44_1$-$44_{16}$ from the low data rate processor, MUX and A/D converter section 38 (FIG. 4). The region of interest selector section 60 is used to examine the charge in each one of the unit cells in the array taken at the low frame rate to identify one, or more detectors having a predetermined characteristic or signature. Once identified, the region of interest selector section 60 generates, or "spawns", a region of interest; a sub-array of the entire array of detectors that includes the identified one or ones of the detectors having the signature and also additional detectors proximate that identified one or ones of the detectors. Here, a region of interest is a sub-set array of 64×64 detectors that includes the identified one or ones of the detectors along with, the other detectors around the identified one or ones of the detectors is generated or "spawned". Here, in this example, the predetermined characteristic or signature is a predetermined threshold level; that is detectors that detect signals greater than a predetermined threshold; such as background noise, for example. Thus, here the region of interest selector section 60 includes a plurality of sixteen threshold detectors $64_1$-$64_{16}$, each one coupled to a corresponding one of the sixteen outputs $44_1$-$44_{16}$ from the low data rate processor, MUX and A/D converter section 38. The outputs from the sixteen threshold detectors $64_1$-$64_{16}$ are fed to a ROI generator 66, here for example a look-up table, or read only memory (ROM). The ROI generator 66 is programmed to produce enable signals on 64×64 of output enable/disable lines $68_1$-$68_{2048\times2048}$ that are associated with the one or ones of the detectors having the signature and also additional detectors proximate that identified one or ones of the detectors; all other ones of the output enable/disable lines $68_1$-$68_{2048\times2048}$ being disabled. That is, the ROI generator 66 establishes or "spawns" the region of interest of a sub-set array of 64×64 detectors of the entire 2048×2048 array of detectors that includes the identified one or ones of the detectors along with the other detectors around the identified one or ones of the detectors.

The outputs of capacitors $C_1$-$C_{20}$, in each of the analog storage sections $52_1$-$52_{2048\times2048}$ is fed to a corresponding one of 2048×2048, twenty to one commutators $70_1$-$70_{2048\times2048}$, as indicated. The commutators $70_1$-$70_{2048\times2048}$ operate in parallel to produce twenty frames of data sequentially from the entire array at a rate of the high data rate R1, here 200 Hz at outputs $72_1$-$72_{2048,2048}$ of the commutators $70_1$-$70_{2048\times2048}$, respectively. Each one of the outputs $72_1$-$72_{2048\times2048}$ is coupled to a corresponding one of 2048×2048 gated amplifiers $74_1$-$74_{2048\times2048}$, respectively. Each one of the gated amplifiers $74_1$-$74_{2048\times2048}$ is fed an enable/disable signal from a corresponding one of the ROI generator 66 output enable/disable lines $68_1$-$68_{2048\times2048}$, respectively, as indicated. As noted above, only 64×64 of the enable/disable lines $68_1$-$68_{2048\times2048}$ are enabled, corresponding to a single region of interest.

The outputs from the gated amplifiers $74_1$-$74_{2048\times2048}$ are fed to a selector 78. The selector 78 has 2048×2048 inputs, each one being coupled to a corresponding one of the 2048×2048 gated amplifiers $74_1$-$74_{2048\times2048}$, as indicated. The selector 78 is also fed the enable/disable signals on enable/disable lines $68_1$-$68_{2048\times2048}$. The selector 78 passes to its output lines $80_1$-$80_{64\times64}$ only the outputs from the enabled gated amplifiers; thus, the output of the selector 78 produces a sequence of frames of the twenty most recent frames from only the detectors in the 64×64 sub-array of detectors in the identified region of interest. The 64×64 outputs from the selector are converted into digital signals by an analog to digital (A/D) converter section 84.

Figure 6:
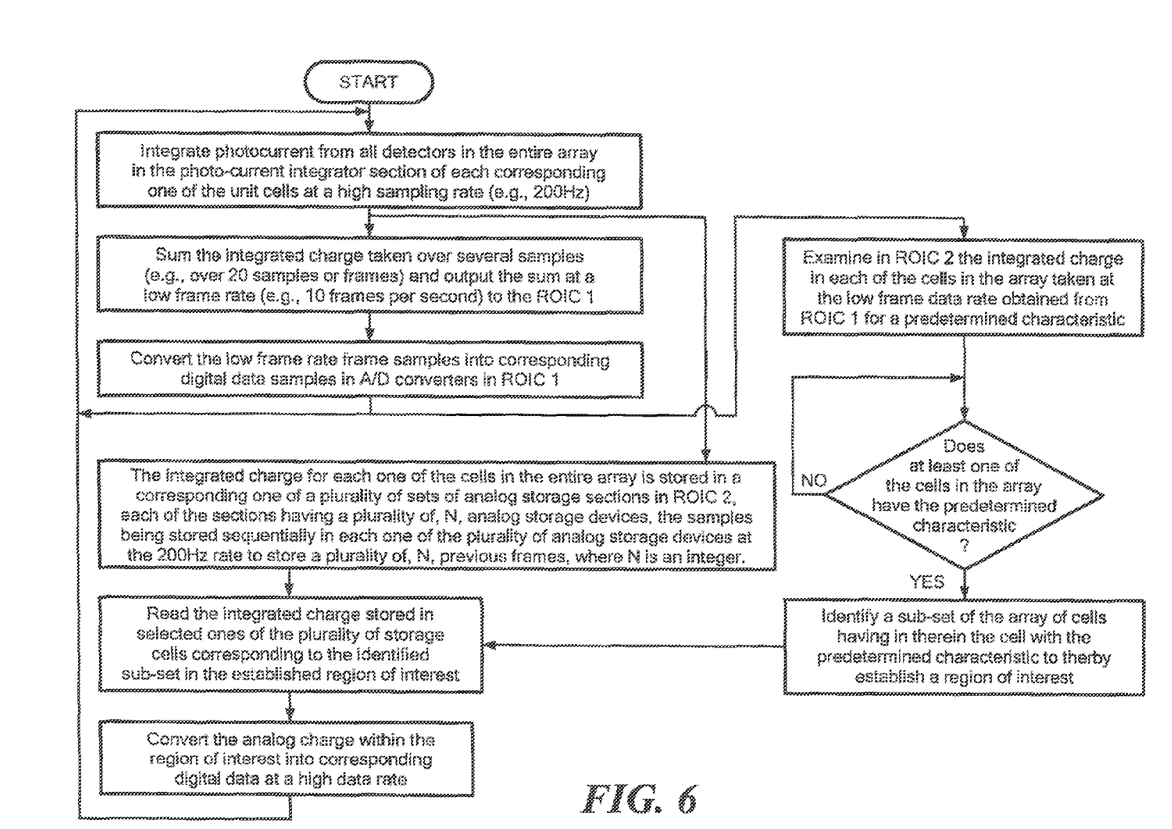
FIG. 6 is a flow diagram of the operation of the focal plane array of FIGS. 1 and 2.

Referring now to FIG. 6, the operation of the system (FIG. 2) is shown. Thus, the photocurrent from all detectors in the entire array is integrated in the photo-current integrator section of each corresponding one of the unit cells at a high sampling rate (e.g., 200 Hz). The integrated charge taken over several samples (e.g., over 20 samples or frames) is summed and outputted at a low frame rate (e.g., 10 frames per second) to the ROIC 1. The low frame rate frame samples are converted into corresponding digital data samples in A/D converters in ROIC 1.

The integrated charge for each one of the cells in the entire array is stored in a corresponding one of a plurality of sets of analog storage sections in ROIC 2, each of the sections having a plurality of, N, analog storage devices, the samples being stored sequentially in each one of the plurality of analog storage devices at the 200 Hz rate to store a plurality of, N, previous frames, where N is an integer.

The integrated charge in each of the cells in the way is taken at the low frame data rate obtained from ROIC 1 for a predetermined characteristic or signature. A determination is made as to whether at least one of the cells in the array has the predetermined characteristic, or signature. The determination is made in the Region of Interest Selector 60. If there is a sub-set of the array of cells having in therein the cell with the predetermined characteristic a Region of Interest is established and the integrated charge stored in selected ones of the plurality of storage cells corresponding to the identified sub-set in the established Region of Interest is read and the analog charge within the Region of Interest into is converted into corresponding digital data at a High Data rate.

A number of embodiments of the disclosure have been described. Nevertheless, it will be understood that various modifications may be made without departing from the spirit and scope of the disclosure. For example, while an analog storage unit has been described, the charge may be converted to a corresponding digital signal in which case the storage unit would be a digital storage unit. Further, a plurality of region of interest selector sections having the same or different signatures may be includes to enable a corresponding plurality of regions of interest to be observed simultaneously. Still further, other data rates and processing rates, and circuit elements may be used. Accordingly, other embodiments are within the scope of the following claims.

What is claimed is:

1. A system, comprising:
a plurality of detectors;
a plurality of unit cell sections, each one of the storage cell sections being fed by charge produced by a corresponding one of the detectors for producing a sequence of frames; and
a plurality of sets of storage sections, each one of the sets of storage sections being coupled to a corresponding one of the unit cell sections, each one of the sets of storage sections including:
a plurality of storage units for sequentially storing the frames;
a region of interest selector section for examining the frames of the plurality of unit cell sections to detect at least one of the frames having a predetermined characteristic and for identifying a sub-set of the plurality of unit cell sections proximate the detected unit cells having the predetermined characteristic to establish a region of interest; and
a processor sequentially reading the plurality of storage units in the sets of storage sections coupled to the sub-set of unit cell sections in the established region of interest.

2. A focal plane array, comprising:
(A) a plurality of detectors;
(B) a plurality of unit cell sections, each one of the unit cell sections being fed by charge produced by corresponding one of the detectors for producing a sequence of frames;
(C) a plurality of sets of storage sections, each one of the sections being coupled to a corresponding one of the unit cell sections, each one of the sets of storage sections comprising:
(i) a plurality of storage units for sequentially storing the frames;
(D) a region of interest selector, for examining the frames of the plurality of unit cell sections, to detect at least one of the frames produced by the plurality of unit cell sections having a predetermined characteristic and for identifying a sub-set of the plurality of unit cell sections proximate to the at least one of the unit cell sections detected as having the predetermined characteristic to establish a region of interest; and
(E) a processor for
sequentially reading the plurality of storage units in the storage sections coupled to the sub-set of unit cells in the established region of interest.

3. A focal plane array, comprising:
(A) a plurality of detectors;
(B) a plurality of unit cell sections, each one of the unit cell sections being fed by charge produced by corresponding one of the detectors, each one of the unit cell sections, comprising:
(i) an integrator for integrating the charge fed thereto at a first integration/reset at a rate, R1;
(ii) a summer, for summing a plurality, M of the produced frames to produce frames at a low frame rate R2, where R2 is R1/M;
(iii) a toggle for periodically switching the integrated charge between: the summer; and, a high data rate output to produce frames at the high frame rate;
(C) a low data rate section fed by the frames produced at the low frame rate by the plurality of unit cell sections, for processing the low frame rate frames produced by the plurality of unit cells;
(D) a high data rate section, coupled to the frames produced at the high frame rate by the plurality of unit cell sections, comprising:
(i) a plurality of sets of storage sections, each one of the sections being coupled to a corresponding one of the unit cell sections, each one of the set of storage sections comprising:
a plurality of storage units for sequentially storing the frames produced at the high frame rate;
(ii) a region of interest selector section, for examining the frames produced at the low frame rate from the plurality of unit cell sections, to detect at least one of the frames produced at the low frame rate having a predetermined characteristic; identifying a sub-set of the plurality of unit cell sections proximate at least one of the unit cell sections detected as having the predetermined characteristic to establish a region of interest; and sequentially reading the plurality of storage units in the sets of storage sections coupled to the selected unit cells at the high frame rate.

4. The focal plane array recited in claim 3 and wherein the region of interest selector section identifies a sub-set of the plurality of unit cell sections proximate to the at least one of the unit cell sections detected as having the predetermined characteristic to establish a region of interest; and including
a processor for
sequentially reading the plurality of storage units in the storage sections coupled to the sub-set of unit cell sections in the established region of interest.

5. The system recited in claim 1 wherein the each one of the storage units includes an analog storage unit.

6. The system recited in claim 1 wherein the each one of the storage units includes a capacitor.

7. The system recited in claim 1 wherein the each one of the storage units includes an digital storage unit.

8. A focal plane array, comprising:
a plurality of detectors;
a plurality of unit cell sections, each one of the unit cell sections being fed charge produced by a corresponding one of the plurality of detectors, the plurality of unit cell sections producing a sequence of frames of the charge; and
a plurality of sets of storage sections, each one of the sets of storage sections being coupled to a corresponding one of the unit cell sections, each one of the sets of storage sections including:
a plurality of storage units for sequentially storing the frames at a predetermined first rate R1;
a region of interest selector section for examining the stored frames of the plurality of produced stored charge of the plurality of unit cell sections to detect whether at least one of the plurality of unit cell sections was fed charge having a predetermined characteristic and for identifying the one of the plurality of unit cell sections producing charge having the predetermined characteristic and a sub-set of the plurality of unit cells proximate the identified one of the unit cell sections to establish a region of interest; and
a processor for, in response to detection that at least one of the plurality of unit cell sections was fed charge having the predetermined characteristic, sequentially reading the plurality of storage units in the storage cell sections coupled to the sub-set of unit cell sections in the established region of interest at a predetermined rate R2 where R1 is different from R2.

9. A focal plane array, comprising:
(A) a plurality of detectors;
(B) a plurality of unit cell sections, each one of the sections being fed by charge produced by corresponding one of the detectors, each one of the cell sections, comprising:

(i) an integrator for integrating the charge fed thereto at a first integration/reset at a first frame rate, R1;

(ii) a summer, for summing a plurality, M of the produced frames to produce frames at a frame rate R2, where R2 is R1/M;

(iii) a toggle for periodically switching a signal voltage corresponding to the integrated charge between: the summer; and, a high data rate output to produce frames at the frame rate R1, where R1 is greater than R2;

(C) a first data rate section fed by the frames produced at the first frame rate by the plurality of unit cell sections, for processing the frames produced by the plurality of unit cell sections at the rate R1;

(D) a second data rate section, coupled to the frames produced at the frame rate R2 by the plurality of unit cell sections;

(E) wherein the first data rate section comprising (i) a plurality of sets of storage sections, each one of the sections being coupled to a corresponding one of the unit cell sections, each one of the set of storage sections comprising:

a plurality of storage units for continuously and sequentially storing the frames produced at the first frame rate data rate section and for continuously and sequentially storing the frame data produced at the first data rate;

(ii) a region of interest selector section, for examining the frames produced by the second data rate section from the plurality of unit cell sections, to detect whether at least one of the plurality of unit cell sections was fed charge having a predetermined characteristic; identifying the one of the plurality of unit cells producing charge having the predetermined characteristic and a sub-set of the plurality of unit cell sections proximate the at least one of the unit cell sections detected as having the predetermined characteristic to establish a region of interest; and sequentially reading the plurality of storage units in the storage sections coupled to the selected unit cell sections at the first data rate.

10. A focal plane array, comprising:

a plurality of detectors;

a plurality of unit cell sections, each one of the unit cell sections being fed charge produced by a corresponding one of the plurality of detectors, the plurality of unit cell sections producing a sequence of frames of the charge;

a plurality of sets of storage sections, each one of the sets of storage sections being coupled to a corresponding one of the unit cell sections, each one of the sets of storage sections including:

a plurality of storage units for sequentially storing a predetermined plurality of the frames at a predetermined first rate for storing, at the first rate, a charge accumulated frame having accumulated charge;

a processor for:

reading from the storage sections at a second rate different from the first rate to examined charge accumulated frame to detect whether a one of the unit cell sections produced charge in the charge accumulated frame has a predetermined characteristic;

identifying a sub-set of the plurality of unit cell sections proximate the one of the detected unit cell sections producing accumulated charge frame having the predetermined characteristic to establish a region of interest; and, sequentially reading at the first rate, the plurality of storage units in the storage sections coupled to the sub-set of unit cells in the established region of interest independent of when the event occurred in the charge accumulated frame.

11. A system, comprising:

a plurality of detectors;

a plurality of unit cell sections, each one of the unit cell sections being fed by charge produced by a corresponding one of the detectors for continuously producing a sequence of frames;

a summing section for continuously producing a continuous sequence of accumulation frames each one of the accumulation frames comprising a summation of a predetermined plurality of the continuously produced sequence of frames; and a plurality of sets of storage sections, each one of the sets of storage sections being coupled to a corresponding one of the unit cell sections, each one of the sets of storage sections including:

a plurality of storage units for sequentially storing the continuously produced sequence of frames;

a region of interest selector section for examining the accumulation frames produced by the summing section to detect at least one of the accumulation frames having a predetermined characteristic and for identifying a sub-set of the plurality of unit cell sections proximate the detected unit cell sections having the predetermined characteristic to establish a region of interest; and a processor for sequentially reading the storage sections coupled to the sub-set of unit cell sections in the established region of interest simultaneously while the storage sections continues to sequentially store the continuously produced sequence of frames.

12. A focal plane array, comprising:

an array of detectors;

a plurality of unit cells, each one of the unit cells being fed by charge produced by a corresponding one of the detectors for continuously producing a sequence of frames at a high frame rate;

a summing section for continuously producing a continuous sequence of accumulation frames each one of the accumulation frames comprising a summation of a predetermined plurality of the continuously produced sequence of frames at a low frame rate; and a memory system, comprising:

(i) a plurality of storage units;

(ii) a distribution section fed by the sequence of frames produced at the high frame rate for continuously distributing the sequence of frames produced at the high frame rate for storage among the plurality of storage units;

(iii) a commutation section operating concurrently with the distribution section for continuously retrieving a sequence of the stored frames from the plurality of storage units at the high frame rate;

a region of interest selector section for examining the accumulation frames produced by the summing section at the low frame rate to detect at least one of the accumulation frames having a predetermined characteristic and for identifying a sub-set of the plurality of unit cells proximate the detected unit cells having the predetermined characteristic to establish a region of interest; and a processor for sequentially coupling from a portion of the storage units storing frames produced by the sub-set of units in the established region of interest from the memory system at the high data rate simultaneously while the memory system continues to sequentially store the sequence of frames produced at the high data rate.

\* \* \* \* \*